United States Patent
Lipschutz et al.

(10) Patent No.: US 8,428,055 B2
(45) Date of Patent: *Apr. 23, 2013

(54) SCALABLE CENTRAL MEMORY SWITCHING FABRIC

(75) Inventors: David Lipschutz, Lexington, MA (US); John C Carney, Bedford, MA (US); Thomas V Radogna, Westboro, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/018,069

(22) Filed: Jan. 31, 2011

(65) Prior Publication Data

US 2011/0122892 A1    May 26, 2011

Related U.S. Application Data

(63) Continuation of application No. 12/500,463, filed on Jul. 9, 2009, now Pat. No. 7,903,644, which is a continuation of application No. 11/221,700, filed on Sep. 9, 2005, now Pat. No. 7,577,133.

(51) Int. Cl.
*H04L 12/50* (2006.01)
*H04J 3/24* (2006.01)

(52) U.S. Cl.
USPC .......................................... 370/386; 370/474

(58) Field of Classification Search .......... 370/369–389, 370/412–418, 429, 474, 476
See application file for complete search history.

(56) References Cited

U.S. PATENT DOCUMENTS

| | | | |
|---|---|---|---|
| 4,547,877 A * | 10/1985 | Lehman et al. ................ | 370/381 |
| 5,307,343 A * | 4/1994 | Bostica et al. ................. | 370/398 |
| 5,475,682 A * | 12/1995 | Choudhury et al. .......... | 370/229 |
| 5,541,912 A * | 7/1996 | Choudhury et al. .......... | 370/412 |
| 5,644,577 A | 7/1997 | Christensen et al. | |
| 5,812,527 A | 9/1998 | Kline et al. | |
| 5,936,939 A | 8/1999 | Des Jardins et al. | |
| 6,026,093 A | 2/2000 | Bellaton et al. | |
| 6,400,732 B1 * | 6/2002 | Castagna et al. ............. | 370/506 |
| 6,700,869 B1 * | 3/2004 | Falco et al. ................... | 370/230 |
| 6,888,824 B1 | 5/2005 | Fang et al. | |
| 6,907,473 B2 | 6/2005 | Schmidt et al. | |
| 7,039,067 B2 * | 5/2006 | Feinberg et al. .............. | 370/468 |
| 7,050,440 B2 | 5/2006 | Colmant et al. | |
| 7,149,212 B2 | 12/2006 | Calvignac et al. | |
| 7,369,496 B1 | 5/2008 | Wiggins et al. | |
| 7,372,864 B1 | 5/2008 | Reast et al. | |
| 7,385,965 B2 | 6/2008 | McCormick et al. | |
| 7,415,031 B2 | 8/2008 | Primrose et al. | |

(Continued)

OTHER PUBLICATIONS

Co-Pending U.S. Appl. No. 12/500,463, filed Jul. 9, 2009 entitled "Processing of Partial Frames and Partial Superframes" by Davi Lipschutz et al., 43 pages.

*Primary Examiner* — Hong Cho
(74) *Attorney, Agent, or Firm* — Harrity & Harrity, LLP

(57) ABSTRACT

A system receives a set of datagrams and forms frames based on the datagrams, where at least one of the frames includes data associated with multiple ones of the datagrams. The system writes the frames to memory to form superframes in the memory, where each of the superframes includes multiple ones of frames. The system reads the superframes from the memory, recreates the datagrams based on the superframes, and outputs the datagrams.

20 Claims, 13 Drawing Sheets

U.S. PATENT DOCUMENTS

| | | |
|---|---|---|
| 7,577,133 B1 | 8/2009 | Lipschutz et al. |
| 7,593,330 B1 | 9/2009 | Lipschutz |
| 2002/0010891 A1* | 1/2002 | Klein ........................... 714/767 |
| 2002/0114335 A1* | 8/2002 | Namura ..................... 370/395.7 |
| 2005/0025141 A1 | 2/2005 | Chao et al. |
| 2005/0073956 A1 | 4/2005 | Moores et al. |
| 2005/0088969 A1 | 4/2005 | Carlsen et al. |
| 2006/0106946 A1 | 5/2006 | Agarwal et al. |
| 2006/0221945 A1* | 10/2006 | Chin et al. .................... 370/381 |

\* cited by examiner

SCALABLE CENTRAL MEMORY SWITCHING FABRIC

This application is a continuation of U.S. patent application Ser. No. 12/500,463 filed on Jul. 9, 2009, now U.S. Pat. No. 7,903,644, issued Mar. 8, 2011, which is a continuation of U.S. patent application Ser. No. 11/221,700 filed Sep. 9, 2005, now U.S. Pat. No. 7,577,133 issued Aug. 18, 2009, the disclosures of which are incorporated herein by reference.

BACKGROUND

1. Field of the Invention

Implementations consistent with the principles of the invention relate generally to data communication and, more particularly, to the use of a scalable central memory switching fabric architecture within a data transfer device.

2. Description of Related Art

A typical shared memory switching architecture includes input and output ports connected via a shared memory switching fabric. Typically, a shared memory switching architecture is used only when the desired aggregate system bandwidth can be achieved using a memory data width equal to or less than a cell size (for cell systems) or a minimum packet size (for packet systems). The shared memory switch architecture sometimes includes multiple memory subsystems. In this case, statistical or hash-based load balancing may be used between the memory subsystems. These approaches can be blocking and/or slower than wire speed.

For high bandwidth systems, lightly buffered or unbuffered cross-point architectures are typically used. These architectures often include delay-bandwidth buffer memory at the ingress and egress line cards. As a result, the memory bandwidth of the system is reduced to that of the line card instead of that of the entire system. With the cross-point architecture, each packet is written and read twice at each of the line cards. Therefore, the total system memory bandwidth required is double that of a shared memory switching architecture. Further, cross-point architectures typically have significant blocking characteristics on a port-to-port basis when there are many sub-ports (streams) per line card.

SUMMARY

According to one aspect, a data transfer device may include a set of ingress units, a set of egress units, and a memory connected to the ingress units and the egress units. At least some of the ingress units may be configured to receive a group of datagrams, form a frame from one or more of the datagrams, and output the frame to the memory. The memory may be configured to receive the frames from the ingress units, store the frames to form superframes, and output the superframes to the egress units. At least some of the egress units may be configured to receive one of the superframes from the memory, reassemble a datagram from data in the superframe and/or a subsequent superframe, and output the datagram.

According to another aspect, a method may include receiving a group of datagrams; forming frames based on the datagrams, where each of the frames may include data associated with one or more of the datagrams; writing the frames to memory to form superframes in the memory, where each of the superframes may include multiple frames; reading the superframes from the memory; reassembling the datagrams based on the superframes; and outputting the reassembled datagrams.

According to yet another aspect, an ingress line card is associated with a data transfer device. The ingress line card may include an interface to receive a group of datagrams and form frames based on the datagrams. Each of the frames may include a header portion and a data portion, where the data portion is capable of storing data associated with multiple datagrams, and the header portion may identify a break between datagrams when the data portion stores data associated with multiple datagrams. The ingress line card may also include a memory to store the datagrams prior to the frames being formed based on the datagrams.

According to a further aspect, an egress line card is associated with a data transfer device. The egress line card may include an interface to receive a group of superframes, where each of the superframes may include data associated with multiple datagrams, and at least one of the superframes may include data less than an entire datagram. The interface may also determine whether all data associated with a datagram is included in one or more of the superframes and reassemble the datagram when all data associated with the data is included in one or more of the superframes. The egress line card may also include a memory to store data associated with the datagrams prior to the datagrams being reassembled.

According to another aspect, a data transfer device may include an ingress unit, a central switching fabric, and an egress unit. The ingress unit may receive a group of datagrams, where each of the datagrams may be associated with an egress point. The ingress unit may also pack data associated with the datagrams into first containers, where each of the first containers may be capable of storing data associated with multiple datagrams. The central switching fabric may pack a group of the first containers into each of a group of second containers, where the first containers associated with a particular one of the second containers may include data associated with datagrams associated with a same egress point. The egress unit may receive one or more of the second containers from the central switching fabric, recreate the datagrams from data in the one or more of the second containers, and output the datagrams.

According to a further aspect, a data transfer device may include a central switching fabric. The central switching fabric may include a central shared memory to receive first data of a first length, store the first data as second data of a second length, where the second length is larger than the first length, and output the second data.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention relate to a central shared memory switching fabric that is scalable, reduces the amount of memory (buffering) needed, and is more ideal in terms of blocking over existing switching fabrics. All of the memory bandwidth is available as needed for each incoming datagram regardless of the destination of the incoming datagram. In other words, sufficient memory bandwidth is available even in the extreme case where datagrams from all of the inputs are destined for the same output.

Exemplary Device

Figure 1:
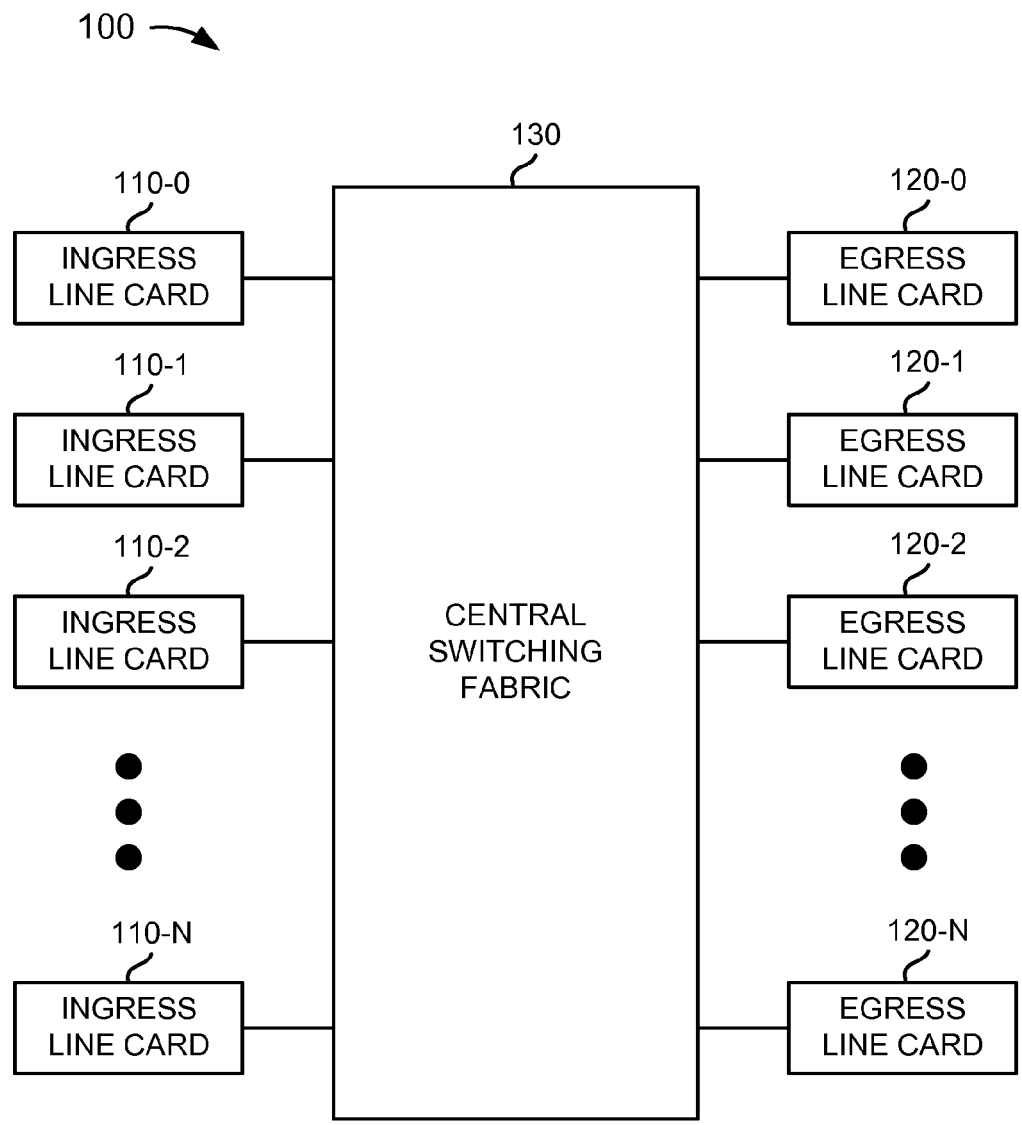
FIG. 1 is an exemplary diagram of a device in which systems and methods consistent with the principles of the invention may be implemented.

FIG. 1 is an exemplary diagram of a device 100 in which systems and methods consistent with the principles of the invention may be implemented. In one implementation, device 100 may correspond to a data transfer device, such as a router, a switch, a gateway, a bridge, or the like. Device 100 may include a set of ingress line cards 110-1 through 110-N (collectively referred to as "ingress line cards 110"), a set of egress line cards 120-1 through 120-N (collectively referred to as "egress line cards 120"), and a central switching fabric 130.

While FIG. 1 shows that device 100 includes separate sets of ingress line cards 110 and egress line cards 120, the functions of an ingress line card and an egress line card may be implemented within a single line card. In other words, a single line card may include ingress line card functionality as well as egress line card functionality. In another implementation, ingress line cards 110 and egress line cards 120 may be physically separate line cards and may differ in number. For example, there may be more or fewer ingress line cards 110 than egress line cards 120. In either implementation, ingress line cards 110 and egress line cards 120 may connect to central switching fabric via wired, wireless, and/or optical connections.

Ingress line cards 110 may include input units that receive streams of datagrams on ingress links and make the datagrams available to central switching fabric 130. A "datagram," as used herein, may refer to any type or form of data, including packet and non-packet data. Some of ingress line cards 110 may differ in speed and/or bandwidth. For example, a first ingress line card that connects to the core of a network, such as the Internet, may include more speed and/or bandwidth than a second ingress line card that connects to the edge of the network. In this case, the first ingress line card may include more ingress links (that may possibly be bound together as a single stream) than the second ingress line card.

Figure 2:
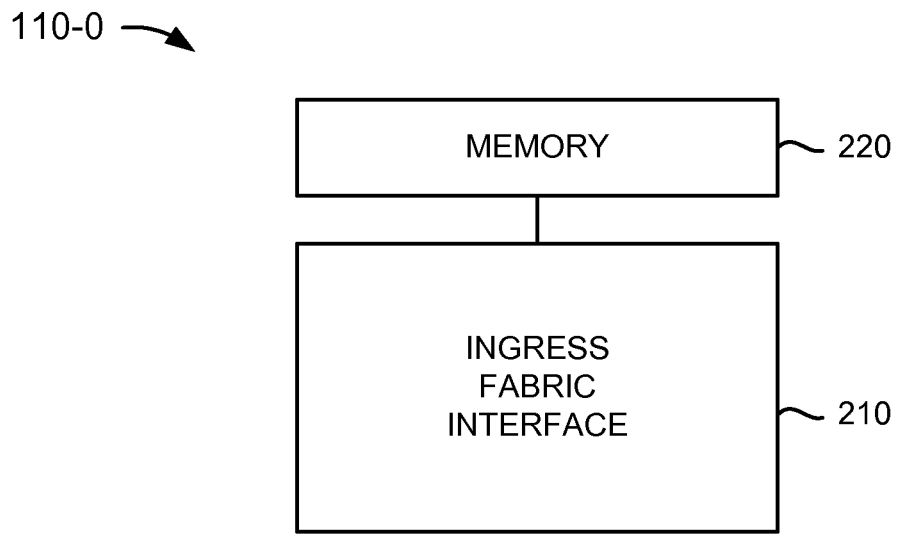
FIG. 2 is an exemplary block diagram of a portion of an ingress line card of FIG. 1 according to an implementation consistent with the principles of the invention.

FIG. 2 is an exemplary block diagram of a portion of ingress line card 110-0 according to an implementation consistent with the principles of the invention. Other ones of ingress line cards 110 may include the same or similar components.

As shown in FIG. 2, ingress line card 110-0 may include an ingress fabric interface 210 and a memory 220. Ingress fabric interface 210 may include a field programmable gate array (FPGA) or an application specific integrated circuit (ASIC). Ingress fabric interface 210 may receive streams of datagrams over one or more ingress links and generate frames based on the datagrams.

A frame may be thought of as a container that includes a fixed amount of data associated with one or more datagrams. In one implementation, a frame is 64 bytes in length. In another implementation, a frame is 256 bytes in length. In yet another implementation, a frame may have a length different from 64 or 256 bytes. A frame may be larger, smaller, or the same size as a datagram. Because the datagrams may differ in size, a frame may be larger than some datagrams, smaller than other datagrams, and the same size as yet other datagrams.

Ingress fabric interface 210 may pack datagrams into frames without regard to the beginnings and endings of the datagrams. In other words, the datagrams need not be aligned with the start and end of the frame. A frame may be filled quickly or gradually as datagrams arrive on the ingress link(s).

Figure 3:
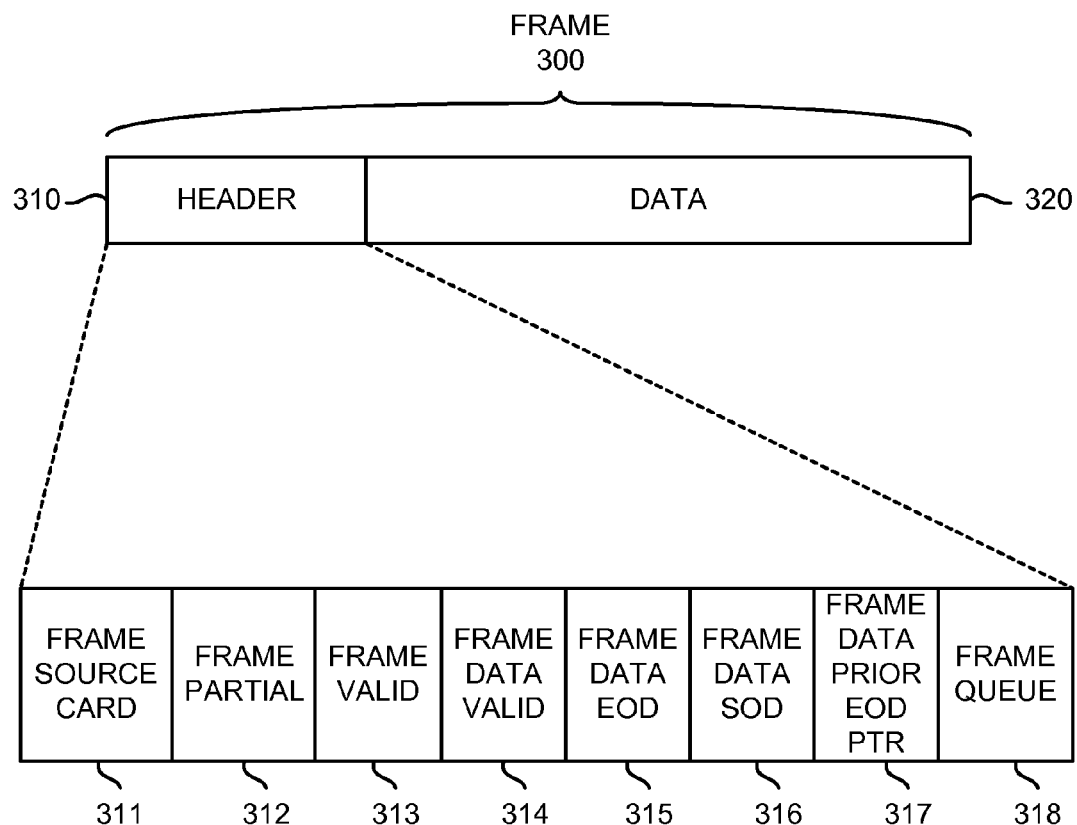
FIG. 3 an exemplary diagram of a frame according to an implementation consistent with the principles of the invention.

FIG. 3 is an exemplary diagram of a frame 300 according to an implementation consistent with the principles of the invention. Frame 300 may include a header portion 310 and a data portion 320. Header portion 310 may be generated by ingress fabric interface 210 (FIG. 2). Header portion 310 may be passed along with frame 300 within device 100 and may be used to reassemble the datagrams at egress line cards 120. In one implementation, header portion 310 is not used by central switching fabric 130, but is simply forwarded by central switching fabric 130 along with frame 300.

As shown in FIG. 3, header portion 310 may include frame source card field 311, frame partial field 312, frame valid field 313, frame data valid field 314, frame data end of datagram (EOD) field 315, frame data start of datagram (SOD) field 316, frame data prior EOD pointer (PTR) field 317, and frame queue field 318. In other implementations, header portion 310 may contain more, fewer, or different pieces of information.

Frame source card field 311 may identify the ingress line card that generated frame 300. Frame queue field 318 may identify a queue with which frame 300 is associated. As described below, the queue may be associated with a particular egress point of device 100. Frame source card field 311 and frame queue field 318 may be used for reassembly by an egress line card.

Frame partial field 312 may indicate whether frame 300 is complete. In some situations, it may be beneficial for an ingress line card to output a frame that is not completely filled with data from one or more datagrams. When frame partial field 312 indicates that frame 300 is not complete, then data portion 320 may be less than filled with data from one or more datagrams.

Frame valid field 313 may indicate whether frame 300 is valid. Frame data valid field 314 may indicate whether data portion 320 of frame 300 is completely empty. Frame data EOD field 315 may identify where the end of a datagram occurs within data portion 320. Frame data SOD field 316 may identify where the start of a datagram occurs within data portion 320. Frame data EOD field 315 and frame SOD field 316 may be used to identify a break between datagrams in frame 300 and identify where this break occurs. Frame data prior EOD pointer field 317 may indicate whether frame 300 contains one complete datagram.

Data portion 320 may store data associated with one or more datagrams. When data portion 320 stores data associated with multiple datagrams, the data may be packed together with no holes or gaps between them and without regard to the beginnings and endings of the datagrams. In other words, data portion 320 may store all or part of an entire datagram and may store parts of two or more datagrams.

Returning to FIG. 2, ingress fabric interface 210 may accumulate data for frames and when a frame is complete, it may output the frame and a notification. The notification may inform central switching fabric 130 (FIG. 1) that ingress line card 110-0 is outputting a frame. The notification may include information that identifies the egress point with which the frame is associated. An egress point may correspond to an egress link or port of an egress line card or some finer granularity, such as a class of traffic, a priority of traffic, a weight assigned to particular traffic or a particular link or port, etc.

Memory 220 may include a memory device, such as a SRAM. Memory 220 may include a number of bins (e.g., queues) to store datagrams for frames. In one implementation, memory 220 may include a bin for each egress point. Memory 220 may accumulate datagrams for a particular egress point in a corresponding bin until a complete frame's worth of data is accumulated. At this point, ingress fabric interface 210 may generate and output the frame.

Returning to FIG. 1, egress line cards 120 may include egress units that receive superframes from central switching fabric 130, reassemble datagrams from the superframes, and make the datagrams available to egress links. A superframe may be considered a container that includes a fixed number of frames, equal to or greater than two frames. In one implementation, a superframe includes sixteen frames. In another implementation, a superframe may include more or fewer frames.

Similar to ingress line cards 110, some of egress line cards 120 may differ in speed and/or bandwidth. For example, a first egress line card that connects to the core of a network, such as the Internet, may include more speed and/or bandwidth than a second egress line card that connects to the edge of the network. In this case, the first egress line card may include more egress links (that may possibly be bound together as a single stream) than the second egress line card.

Figure 4:
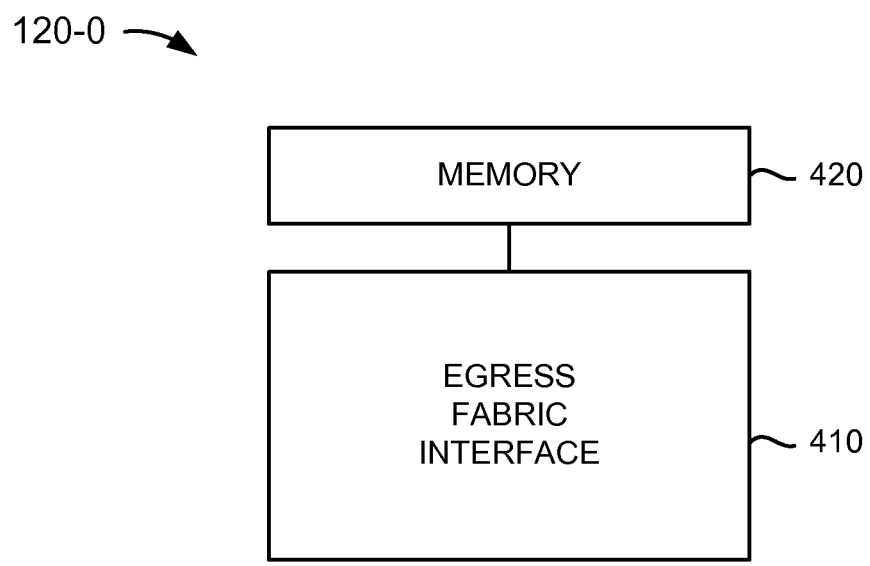
FIG. 4 is an exemplary diagram of a portion of the egress line card of FIG. 1 according to an implementation consistent with the principles of the invention.

FIG. 4 is an exemplary block diagram of a portion of egress line card 120-0 according to an implementation consistent with the principles of the invention. Other ones of egress line cards 120 may include the same or similar components.

As shown in FIG. 4, egress line card 120-0 may include an egress fabric interface 410 and a memory 420. Egress fabric interface 410 may include a FPGA or an ASIC. Egress fabric interface 410 may receive superframes, reassemble datagrams from the superframes, and make the datagrams available to egress links. Egress fabric interface 410 may use information in the headers of the frames within the superframes to identify datagram portions that belong to the same datagrams. For example, egress fabric interface 410 may use information in frame source card field 311 and frame queue field 318 (FIG. 3) to identify the particular datagram with which a frame is associated. Based on this information, egress fabric interface 410 may reassemble the datagrams and output the datagrams on one or more egress links.

Memory 420 may include a memory device, such as a SRAM. Memory 420 may include a number of bins (e.g., queues) to store data associated with datagrams. In one implementation, memory 420 may include a bin for each egress point and ingress point combination. An ingress point may correspond to an ingress link or port of an ingress line card or some finer granularity, such as a class of traffic, a priority of traffic, a weight assigned to particular traffic or a particular link or port, etc. Therefore, memory 420 may have a larger memory requirement than memory 220 (FIG. 2) of ingress line cards 110. Memory 420 may accumulate data associated with datagrams for a particular egress point and ingress point combination in a corresponding bin until all of the data is collected and the datagram can be reassembled. At this point, egress fabric interface 410 may output the datagram on an egress link.

Returning to FIG. 1, central switching fabric 130 may be implemented on a circuit card. Alternatively, there might be multiple planes of central switching fabrics 130 implemented on one or more circuit cards. Generally, central switching fabric 130 may store frames and schedule their transmission via egress line cards 120.

Figure 5:
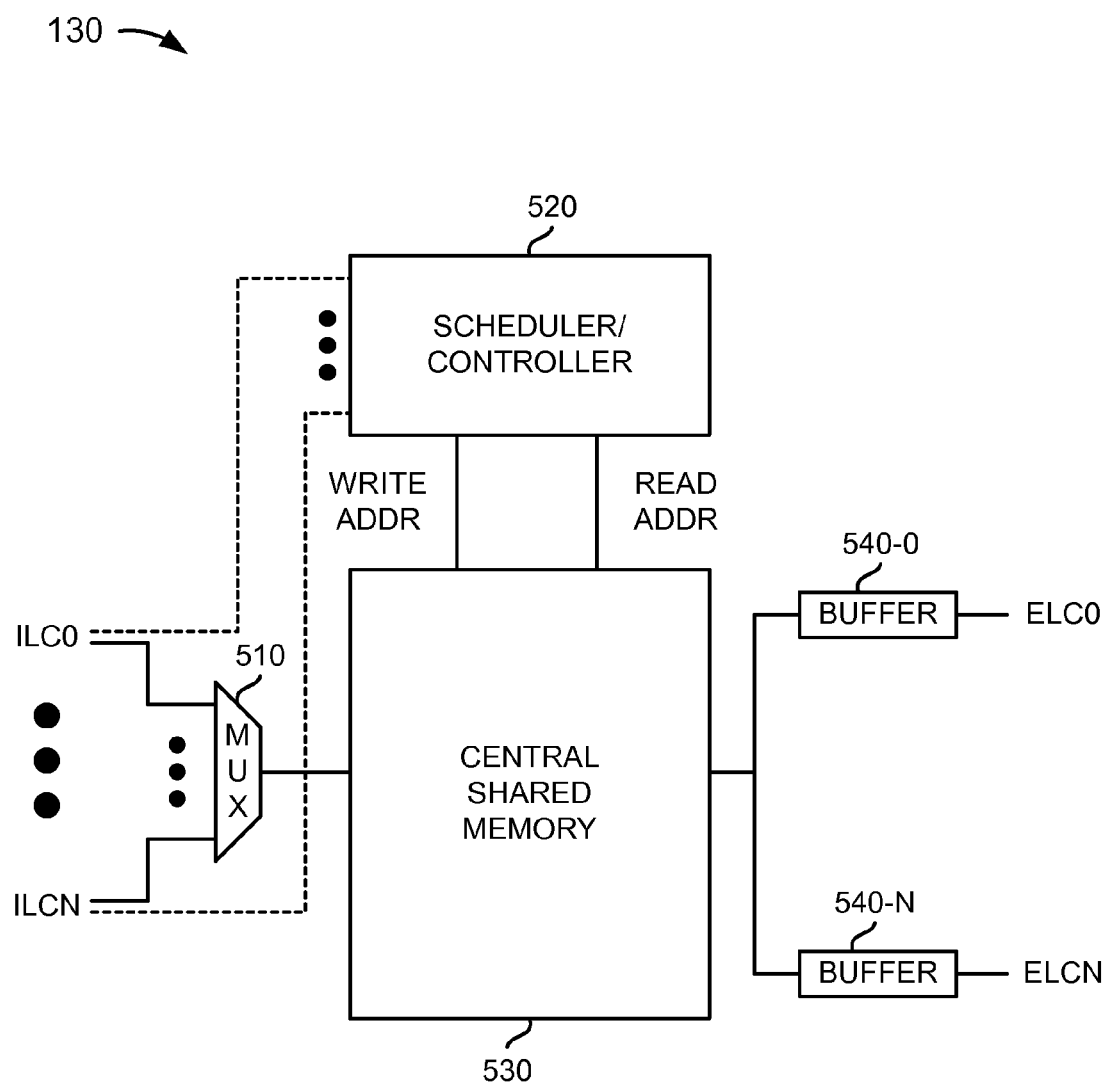
FIG. 5 is an exemplary diagram of a portion of the central switching fabric of FIG. 1 according to an implementation consistent with the principles of the invention.

FIG. 5 is an exemplary diagram of a portion of central switching fabric 130 according to an implementation consistent with the principles of the invention. As shown in FIG. 5, central switching fabric 130 may include a multiplexer 510, a scheduler/controller (S/C) 520, a central shared memory 530, and a set of buffers 540-0 through 540-N (collectively referred to as "buffers 540").

Multiplexer 510 may receive frames from ingress line cards 110 and forward them to memory 530. In one implementation, multiplexer 510 may be controlled to select certain frames to forward to memory 530. For example, S/C 520 may control multiplexer 510 to forward a frame at substantially the same time that S/C 520 outputs a write address corresponding to that frame. Alternatively, multiplexer 510 may select frames to forward according to a schedule, such as a round robin schedule.

S/C 520 may include a FPGA or an ASIC. S/C 520 may operate as a master bookkeeper for memory 530. S/C 520 may receive notifications from ingress line cards 110 when ingress line cards 110 send frames to multiplexer 510. S/C 520 may generate write addresses for storing the frames in memory 530 and read addresses for reading superframes from memory 530.

Figure 6:
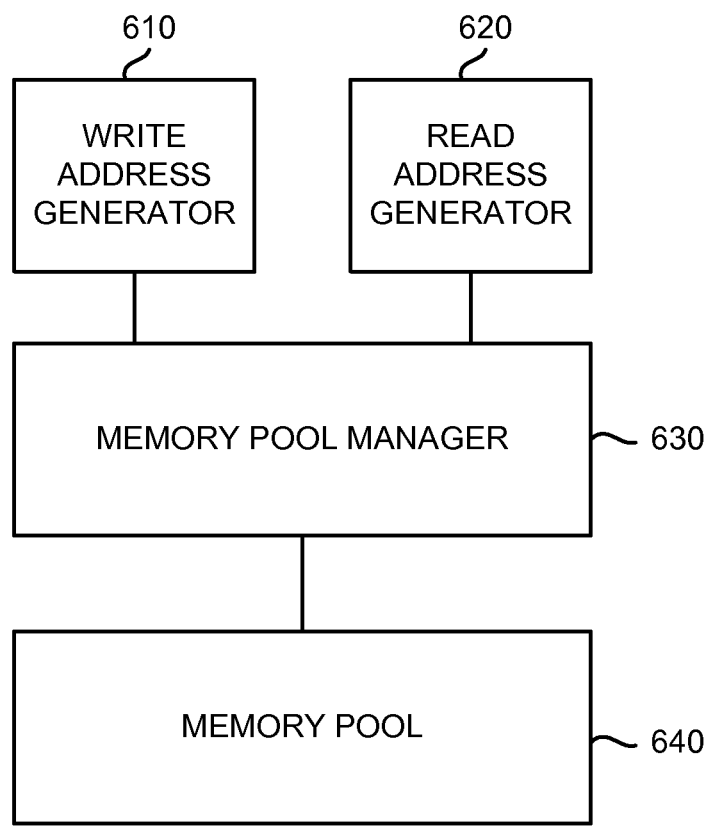
FIG. 6 is an exemplary diagram of a portion of the scheduler/controller of FIG. 5 according to an implementation consistent with the principles of the invention.

FIG. 6 is an exemplary diagram of a portion of S/C 520 according to an implementation consistent with the principles of the invention. As shown in FIG. 6, S/C 520 may include a write address generator 610, a read address generator 620, a memory pool manager 630, and a memory pool 640. Write address generator 610 may determine and generate write addresses for storing frames as superframes in memory 530. Read address generator 620 may determine and generate read addresses for reading superframes from memory 530.

Memory pool manager 630 may control the generation of write and read addresses by write address generator 610 and read address generator 620, respectively. Memory pool manager 630 may also track the addresses at which superframes are stored in memory 530. Memory pool manager 630 may track these addresses in queues of references to memory locations within memory 530 that contain data that needs to be sent to egress line cards 120. As described below, these queues may be maintained within memory pool 640.

Memory pool manager 630 may store frames associated with the same egress point together in the same superframe in memory 530. Memory pool manager 630 may allocate a buffer representing the superframe to a queue associated with the egress point and track how complete the superframe is. With the arrangement described herein, it does not matter whether the superframe gets completed gradually over time from a single ingress line card or all at once from multiple, possibly all, ingress line cards.

When memory pool manager 630 determines that the superframe is complete (i.e., filled with frames), memory pool manager 630 may enqueue it into a queue or list of superframes that are complete and pending transmission via a particular egress point. Because the superframe is bigger, possibly many times bigger, than a frame, memory pool manager 630 may have several clock cycles to identify the next superframe to be read from memory 530. Memory pool manager 630 may service each of the queues or lists of completed superframes equally (e.g., according to a round robin schedule). When priorities, weights, etc. are associated with the queues/lists, it may take memory pool manager 630 several clock cycles to determine which superframe is to be read next.

Memory pool 640 may include a memory device, such as a SRAM. Memory pool 640 may maintain a number of queues to store references to locations in memory 530. Memory pool 640 may also maintain a number of lists or queues of completed superframes. At a minimum, memory pool 640 may include one queue/list for each of egress line cards 120. In practice, however, memory pool 640 may include multiple queues/lists for each of egress line cards 120. For example, a queue/list may be set up to correspond to an output port of an egress line card 120, a class of traffic on the output port, a priority associated with the class of traffic on the output port, or some finer or other degree of granularity.

The queues/lists may be set up as point to point (a single ingress point to a single egress point), point to multi-point (a single ingress point to multiple egress points), multi-point to point (multiple ingress points to a single egress point), or multi-point to multi-point (multiple ingress points to multiple egress points). In the point to point case, a queue/list may be set up to store information (e.g., references to locations in memory 530 or information regarding completed superframes) associated with frames from a single ingress point destined for a single egress point. In the point to multi-point case, a queue/list may be set up to store information (e.g., references to locations in memory 530 or information regarding completed superframes) associated with frames from a single ingress point destined for multiple egress points. In the multi-point to point case, a queue/list may be set up to store information (e.g., references to locations in memory 530 or information regarding completed superframes) associated with frames from multiple ingress points destined for a single egress point. In the multi-point to multi-point case, a queue/list may be set up to store information (e.g., references to locations in memory 530 or information regarding completed superframes) associated with frames from multiple ingress points destined for multiple egress points.

The queues/lists may be maintained as linked lists within memory pool 640. This allows flexibility in the size of any particular queue/list and the location at which an item for the queue/list is stored within memory pool 640. For each queue/list, memory pool 640 may include a head pointer that identifies the top of the queue/list, a tail pointer that identifies the bottom of the queue/list, and for each item in the queue/list, a pointer to the next item in the queue/list. Memory pool 640 may also track how many items are in each queue/list.

Returning to FIG. 5, memory 530 may store frames as superframes. Memory 530 may contain sufficient bandwidth to write from all ingress line cards 110. As a result, there is no congestion at multiplexer 510.

Figure 7:
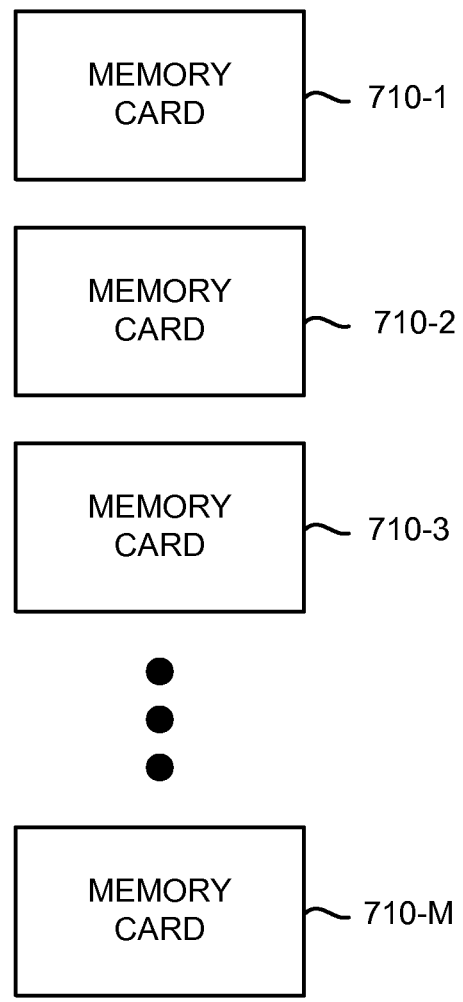
FIG. 7 is an exemplary diagram of a portion of the memory of FIG. 5 according to an implementation consistent with the principles of the invention.

FIG. 7 is a diagram of a portion of memory 530 according to an implementation consistent with the principles of the invention. As shown in FIG. 7, memory 530 may include a set of memory cards 710-1 through 710-M (collectively referred to as "memory cards 710"). Each of memory cards 710 may include a memory device, such as a SRAM or DRAM. The actual number of memory cards 710 included in memory 530 may be based on one or more network parameters (e.g., the throughput of device 100, the amount of network traffic traversing device 100, etc.). The bandwidth of memory 530 can be increased by adding one or more additional memory cards 710. Memory cards 710 may function as a logical memory device with a single read address, a single write address, and a wide data input/output.

One of memory cards 710 may be used as a backup memory. For example, this memory card may include an exclusive OR (XOR) of the data in the other memory cards. Therefore, when a memory card fails, the backup memory card can be used to recreate the data in the failed memory card and it can be hot swapped with the failed memory card.

Returning to FIG. 5, buffers 540 may include rate-matching memory devices, such as first-in, first-out (FIFO) memories. The read bandwidth of memory 530 may be much larger than the bandwidth that can be accepted by or that is desired by egress line cards 130. Buffers 540 may adjust the rate to that handled by egress line cards 130. It may also be desirable to include rate-matching memory devices on the ingress side between ingress line cards 110 and memory 530 (not shown).

Exemplary Processing

Figure 8:
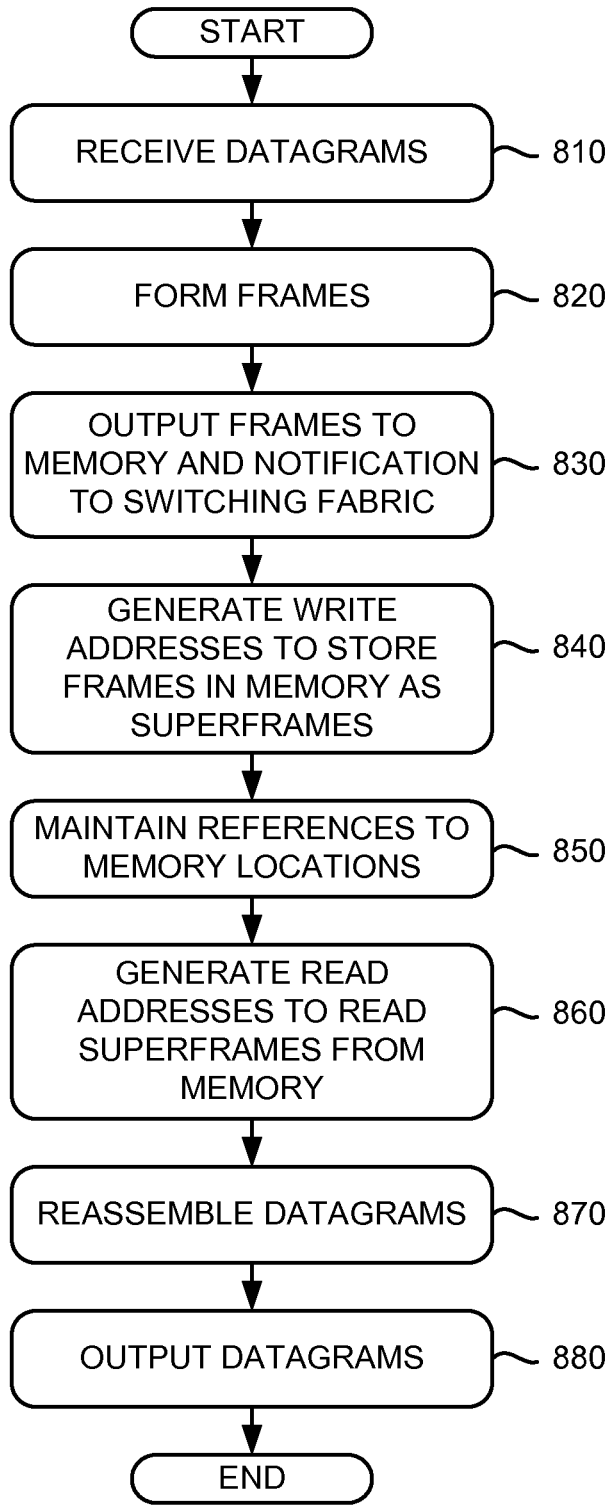
FIG. 8 is a flowchart of an exemplary operation for processing datagrams according to an implementation consistent with the principles of the invention.

FIG. 8 is a flowchart of an exemplary operation for processing datagrams according to an implementation consistent with the principles of the invention. FIGS. 9-14 illustrate processing that may be performed with regard to the exemplary operation of FIG. 8 according to an implementation consistent with the principles of the invention.

Figure 9:
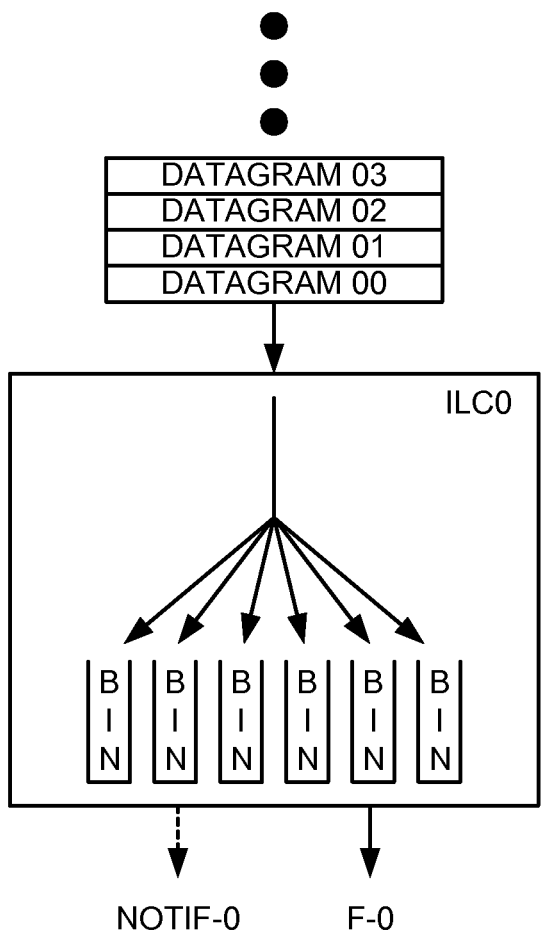
FIGS. 9-14 illustrate processing that may be performed with regard to the exemplary operation of FIG. 8 according to an implementation consistent with the principles of the invention.

Processing may begin with the receipt of datagrams on ingress links (block 810). As shown in FIG. 9, ingress line card ILC0 may receive a stream of datagrams. Ingress line card ILC0 may store the datagrams in bins based on the egress points with which the datagrams are intended. The bins may be considered frame containers that may be equal in size to the size of a frame.

Frames may be formed based on the datagrams (block 820). As shown in FIG. 9, ingress line card ILC0 may track the fullness of the bins. Once a bin is filled with a frame's worth of data, regardless of the beginning and ending of any datagram within the bin, ingress line card ILC0 may form a frame based on the data in the bin. For example, ingress line card ILC0 may generate a header portion 310 (FIG. 3) and pack the data from the bin into a data portion 320 of a frame.

The completed frames and notifications may be output to central switching fabric 130 (block 830). As shown in FIG. 9, ingress line card ILC0 may output frame F-0 and notification NOTIF-0. Frame F-0 may correspond to a frame that has been generated by ingress line card ILC0. Notification NOTIF-0 may inform central switching fabric 130 that frame F-0 has been (or is being) output by ingress line card ILC0.

Figure 10:
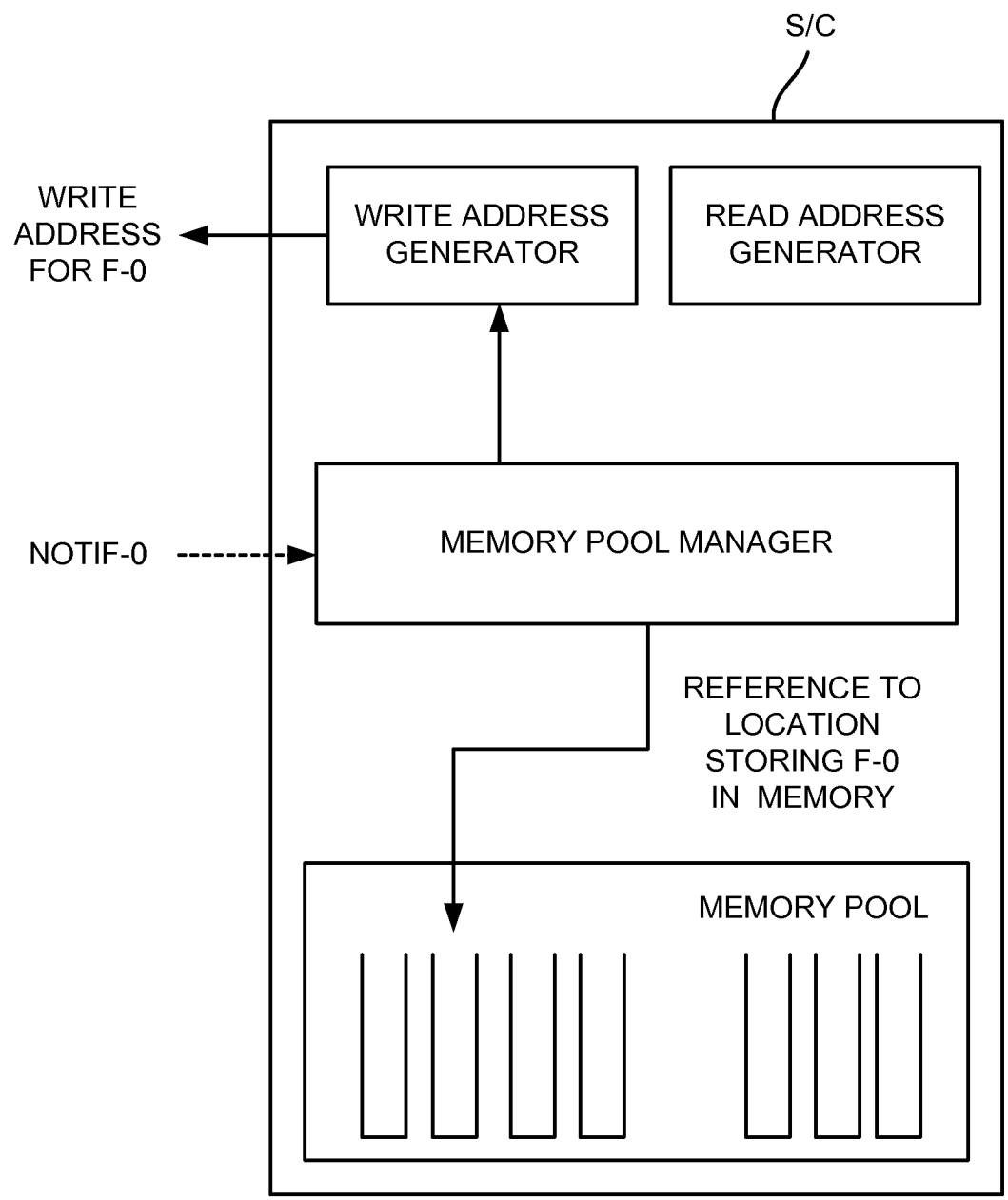
Figure 11:
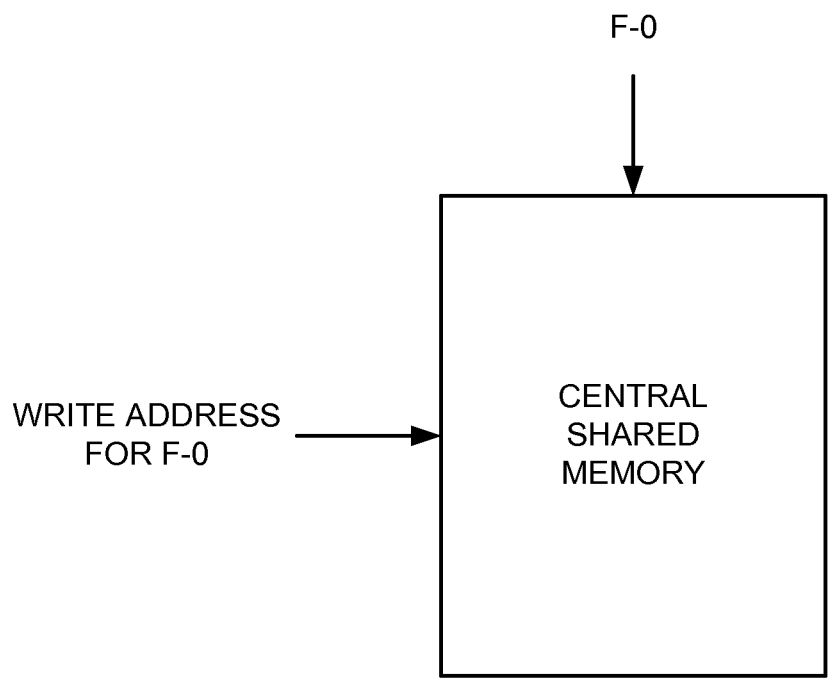
Figure 12:
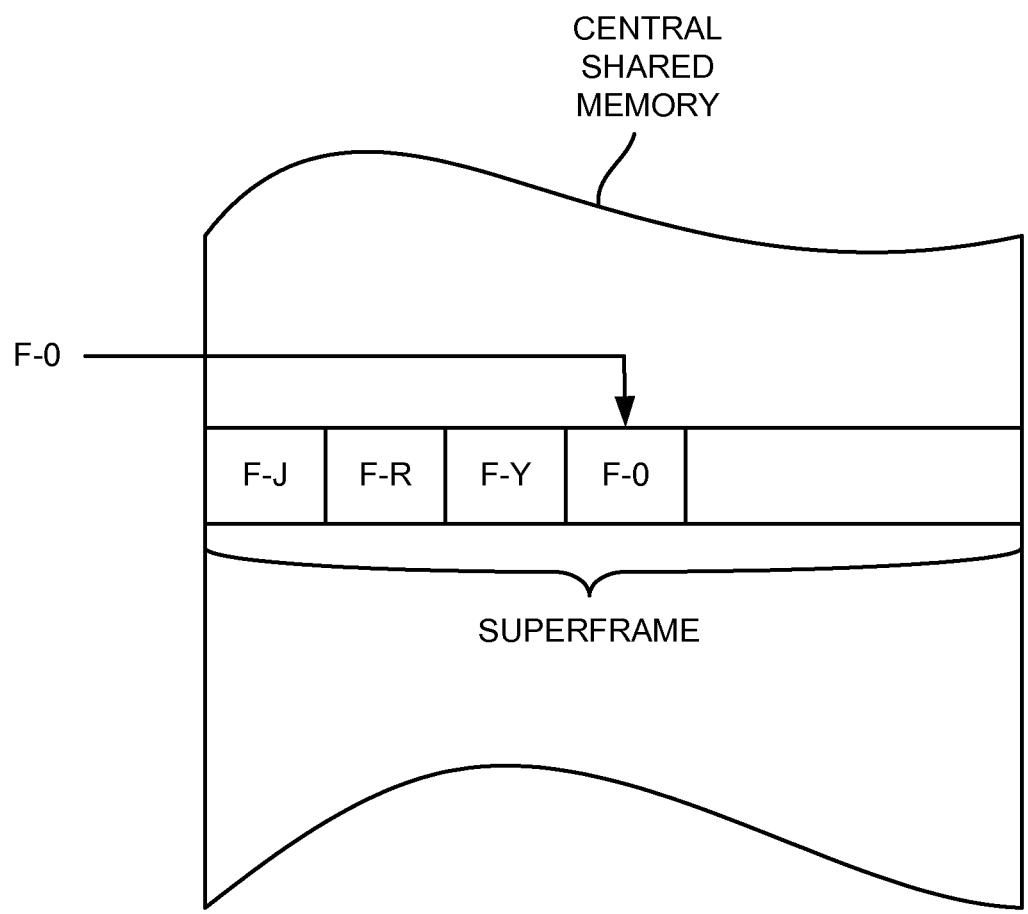

Write addresses may be generated for storing the frames in memory as superframes (block 840). In one implementation, a frame may be stored in memory every clock cycle. As shown in FIG. 10, scheduler/controller S/C may receive notification NOTIF-0 from ingress line card ILC0. S/C may generate a write address for storing frame F-0 in memory. As shown in FIG. 11, the write address may be used to identify the location at which frame F-0 is stored within the memory. As shown in FIG. 12, frame F-0 may be stored within a superframe in memory. As explained above, a superframe may be associated with a particular egress point. Therefore, as shown in FIG. 12, frames F-J, F-R, F-Y, and F-0 may be associated with the same egress point.

References to the locations in memory that the superframes are stored may be maintained (block 850). As shown in FIG. 10, the memory pool manager may store a reference to the location at which the superframe containing frame F-0 is stored in memory in one of several queues. The particular queue in which the reference is stored may correspond to the egress point associated with the superframe.

Figure 13:
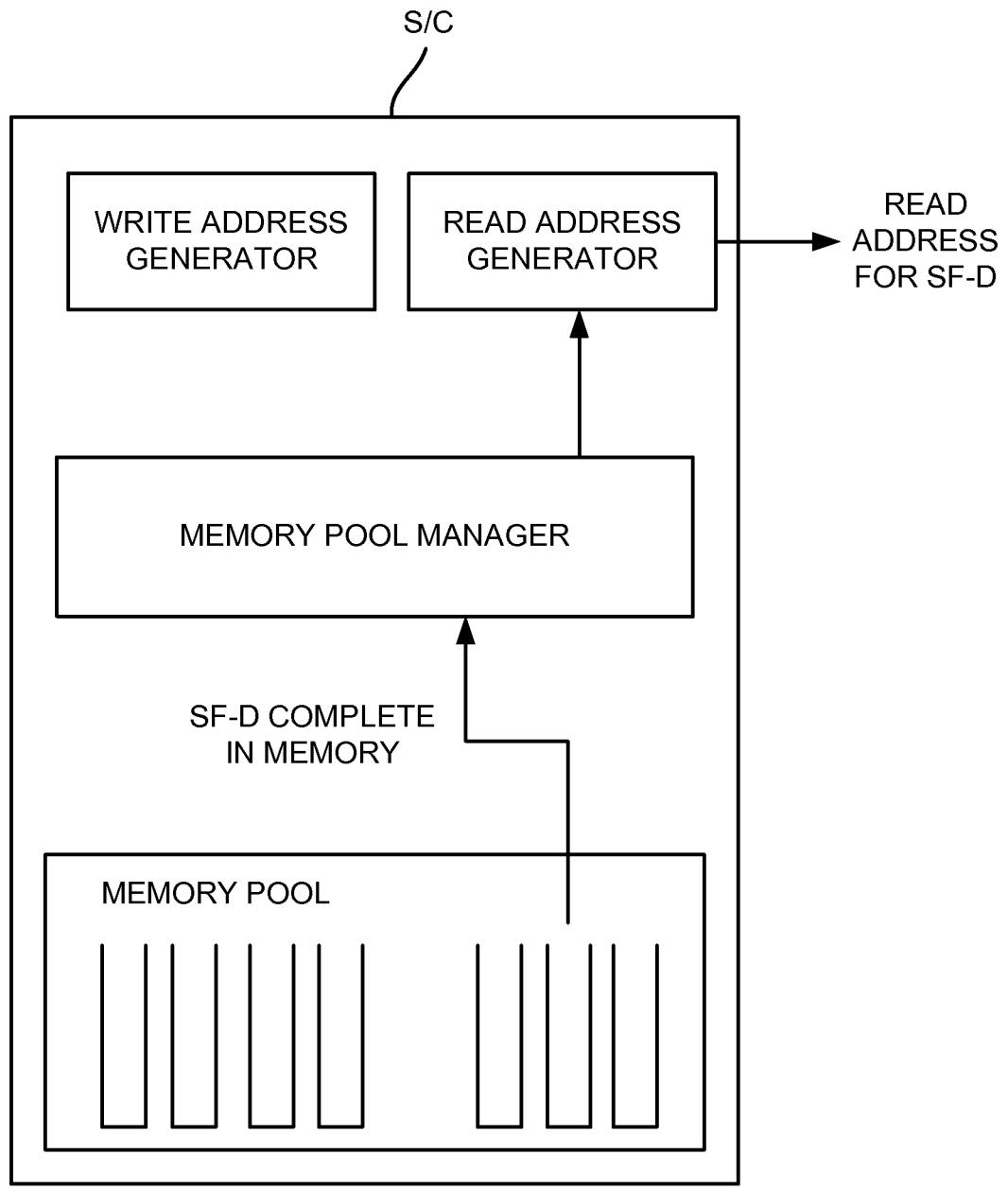
Figure 14:
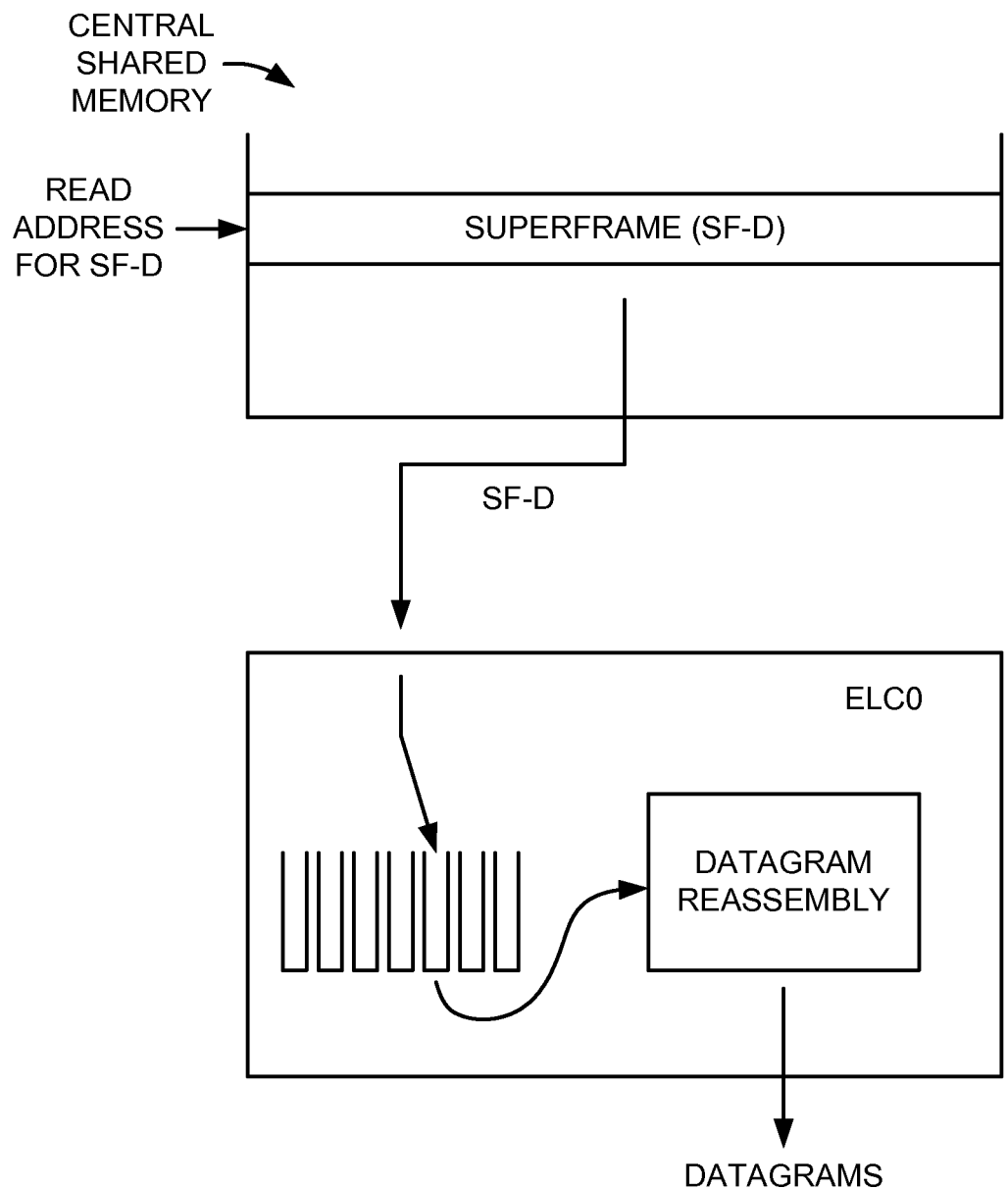

Read addresses may be generated for reading superframes from memory (block 860). In one implementation, a superframe is read from memory every multiple number of a clock cycle (e.g., every 16 clock cycles). As shown in FIG. 13, the memory pool manager within scheduler/controller S/C may identify a queue/list that contains a completed superframe. For example, the memory pool manager might determine that superframe SF-D is the next superframe to be read from memory. The read address generator may generate a read address corresponding to the location in the memory that stores superframe SF-D. As shown in FIG. 14, the read address may be used to cause the memory to output superframe SF-D.

Datagrams may be reassembled from the superframes (block 870). As shown in FIG. 14, egress line card ELC0 may receive superframe SF-D and store it in the appropriate bin. The particular bin in which superframe SF-D is stored may correspond to the egress point associated with superframe SF-D. Egress line card ELC0 may use the data in the bin to reassemble the datagrams. A superframe may include all or a portion of the data associated with a datagram. If the superframe includes all of the data for a datagram, egress line card ELC0 may reassemble the datagram based on this data. If the superframe includes less than all of the data for a datagram, egress line card ELC0 may buffer the data until the rest of the data arrives in a subsequent superframe.

The datagrams may be output on one or more egress links (block 880). As shown in FIG. 14, once egress line card ELC0 reassembles a datagram, it may schedule the datagram for transmission via the appropriate egress link, or links. The datagram may then be output on the egress link, or links.

CONCLUSION

Systems and methods consistent with the principles of the invention may provide a scalable central shared memory switching fabric that may facilitate the transmission of datagrams in an efficient and non-blocking manner. The central shared memory switching fabric may provide these benefits even when implemented by low performance components, such as FPGAs and SRAMs.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 8, the order of the acts may differ in other implementations consistent with the principles of the invention. Also, non-dependent acts may be performed in parallel.

Also, ingress and egress line cards have been described without ingress and egress buffering. In another implementation, the ingress line cards and/or the egress line cards may include such buffering. This buffering may be used by the ingress line cards to hold data when queues of the scheduler/controller exceed a threshold. In this case, the scheduler/controller may send out information on the lengths of its queues to the ingress line cards. In yet another implementation, at least one of the ingress and/or egress line cards may include buffering while at least one other one of the ingress and/or egress line cards may not include such buffering.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a first processor to:
    receive a plurality of datagrams associated with a plurality of flows,
    store, based on the received plurality of datagrams, a plurality of frames,
        each of the plurality of frames including a header portion to identify two or more of the plurality of datagrams and a data portion to store data associated with the two or more of the plurality of the datagrams, and
    form a superframe including two or more of the stored plurality of frames, the two or more of the stored plurality of the frames being formed from datagrams, of the plurality of datagrams, that are associated with one of the plurality of flows; and
a second processor to:
    receive the superframe,
    recreate at least two datagrams based on the received superframe, and
    output the recreated at least two datagrams to a destination associated with the one of the plurality of flows.

2. The device of claim 1, where the superframe is a first superframe, and
where, when recreating the at least two datagrams, the second processor is further to:
    determine that the first superframe includes less than an entirety of the at least two datagrams,
    store data associated with the first superframe based on determining that the first superframe includes less than an entirety of the at least two datagrams,
    receive a second superframe, where the second superframe is received after receiving the first superframe, and
    recreate the at least two datagrams from the stored data associated with the first superframe and data associated with the second superframe.

3. The device of claim 1, further comprising:
a memory to store the superframe formed by the first processor.

4. The device of claim 1, further comprising:
a scheduler to coordinate:
the forming of the superframe by the first processor, and
the outputting of the recreated at least two datagrams by the second processor.

5. The device of claim 4, where the scheduler is further to:
schedule a memory to complete storing the superframe during a clock cycle, and
schedule the second processor to read the stored superframe from the memory after the clock cycle.

6. A device comprising:
a processor to:
receive a plurality of datagrams,
form frames from the plurality of datagrams, each of the frames including a data portion to store data associated with the plurality of the datagrams and a header portion to identify a break between two of the plurality of datagrams,
store the frames to form a superframe, and
output the superframe; and
a memory to store the superframe.

7. The device of claim 6, further comprising an egress unit to:
acquire, from the memory, data in the superframe,
reassemble a particular datagram, of the plurality of datagrams, based on the data in the superframe, and
output the particular datagram.

8. The device of claim 7, where the superframe is a first superframe, and
where the egress unit is further to:
determine that the data in the first superframe includes less than an entirety of data associated with the particular datagram,
acquire, from the memory and based on determining that the first superframe includes less than the entirety of the data associated with the particular datagram, data included in a second superframe, and
use the data included in the first superframe and the data included in the second superframe to reassemble the datagram.

9. The device of claim 7, where the egress unit, when reassembling the reassembled particular datagram, is further to:
sort the data in the superframe into bins,
determine that one of the bins includes all data associated with the particular datagram, and
reassemble, from data in the one of the bins, the particular datagram based on determining that the one of the bins includes all of the data associated with the one datagram.

10. The device of claim 7, where the egress unit is a first egress unit, and
where the device further comprises:
a second egress unit,
at least one of a first speed associated with the first egress unit or a first bandwidth associated with the first egress unit differing, respectively, from a second speed associated with the second egress unit or a second bandwidth associated with the second egress unit, and
the second egress unit being further to reassemble another datagram, of the plurality of datagrams, based on the data in the superframe.

11. The device of claim 6, further comprising:
a scheduler/controller (S/C), associated with the memory, to coordinate:
the storing of the superframe in the memory, or
the outputting of the superframe from the memory.

12. The device of claim 11, where the S/C is further to:
generate write addresses used to write the superframe to the memory and read addresses used to read the superframe from the memory, and
where the S/C includes:
a memory pool, and
a memory pool manager to:
store, in the memory pool, references to one or more locations of the memory at which the superframe is stored,
the references being based on the write addresses.

13. The device of claim 11, where the S/C is further to:
schedule the superframe to be read from the memory periodically.

14. The device of claim 6, where:
the memory includes a plurality of memory cards,
the plurality of memory cards operate as a single logical memory, and
one of the plurality of memory cards is a backup memory card that is hot swapped with another one of the plurality of memory cards without affecting operation of the single logical memory.

15. A method comprising:
receiving, by a network device, a plurality of datagrams;
forming, by the network device, a plurality of frames based on the plurality of datagrams;
forming, by the network device, a plurality of superframes, each of the plurality of superframes including two or more of the plurality of the frames;
reassembling, by the network device, a particular datagram based on the plurality of superframes,
reassembling the particular datagram including:
extracting data associated with a first superframe of the plurality of superframes,
determining that the extracted data includes less than an entirety of data associated with the particular datagram,
extracting data associated with a second superframe of the plurality of superframes,
the data associated with the second superframe including a remaining portion of the data associated with the particular datagram, and
reassembling the particular datagram based on the extracted data associated with the first superframe and the extracted data associated with the second superframe; and
outputting the reassembled datagram.

16. The method of claim 15, where forming the plurality of frames includes:
identifying two or more datagrams, of the received plurality datagrams, that are associated with a particular flow; and
forming two or more frames, of the plurality of frames, based on the identified two or more datagrams.

17. The method of claim 16, where forming the plurality of superframes includes:
forming a particular superframe, of the plurality of superframes, based on the two or more frames associated with the particular flow.

18. The method of claim 15, further comprising:
generating write addresses; and
writing the plurality of superframes to a memory based on the write addresses.

19. The method of claim 18, where reassembling the particular datagram further includes:
generating, based on the write addresses, read addresses; and reading, based on the read addresses, the first superframe and the second superframe from the memory.

20. The method of claim 15, further comprising:
writing the plurality of frames to a memory, where each of the plurality of frames is written to the memory during respective one of a plurality of time periods.

* * * * *